United States Patent [19]
Bell et al.

[11] Patent Number: 5,400,889
[45] Date of Patent: Mar. 28, 1995

[54] CLUTCH ASSEMBLY WITH AUTOMATIC OIL LEVEL CONTROL SYSTEM

[75] Inventors: Douglas W. Bell, Peculiar; Michael D. Walker, Barnard, both of Mo.

[73] Assignee: Agco Corporation, Independence, Mo.

[21] Appl. No.: 124,020

[22] Filed: Sep. 21, 1993

[51] Int. Cl.$^6$ ............................................. F16D 13/74
[52] U.S. Cl. .............................. 192/113.3; 184/6.2; 184/103.1
[58] Field of Search ................... 192/113.3, 113.34; 184/602, 103.1

[56] References Cited

U.S. PATENT DOCUMENTS

| | | | |
|---|---|---|---|
| 2,913,069 | 11/1959 | Kubis | 184/6.2 |
| 3,768,613 | 10/1973 | Brunner | 1962/113.34 |
| 4,531,421 | 7/1985 | Vieth | 192/113.34 X |

*Primary Examiner*—Richard M. Lorence
*Attorney, Agent, or Firm*—Litman, McMahon & Brown

[57] ABSTRACT

A clutch assembly for a vehicle with selective front wheel drive includes an automatic oil level control system. The clutch assembly includes a housing which encloses a hydraulic clutch. The hydraulic clutch, when engaged, connects a front wheel drive shaft to a main vehicle drive shaft. Since the hydraulic clutch has a tendency to leak fluid into the housing, the fluid level within the housing is controlled by pressurizing the housing via compressed air from a turbocharger or the like. A pair of blow back tubes extend into the housing from opposite sides of the housing, and are interconnected and then connected to an unpressurized reservoir, such as the crankcase or transmission case, via an excess oil evacuation line. The blow back tubes have open ports which are positioned such that, when oil simultaneously covers the ports in both blow back tubes, excess oil is evacuated to the connected reservoir. The blow back tube ports are positioned such that excess oil is detected and evacuated when the clutch and drive shaft are static or dynamically rotating.

9 Claims, 2 Drawing Sheets

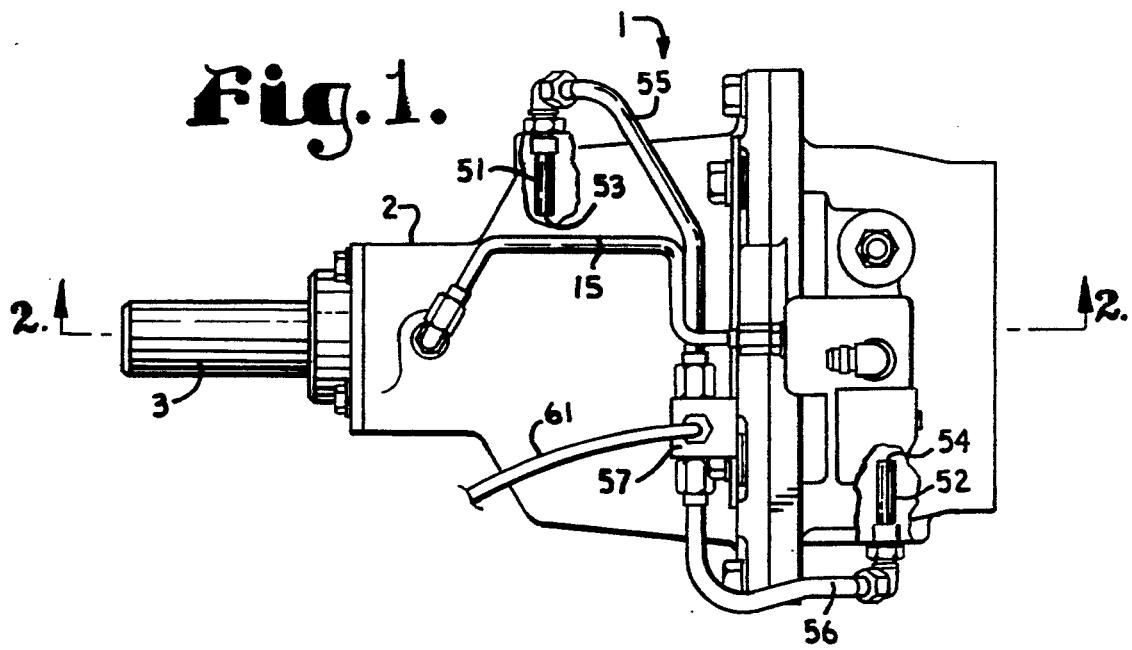
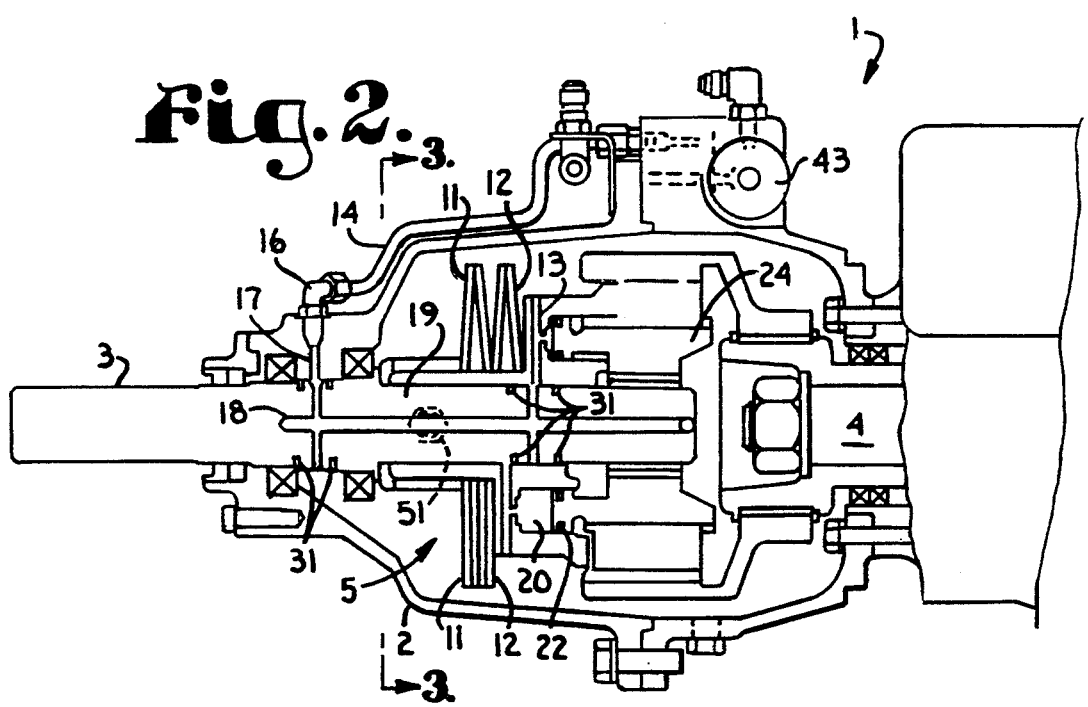

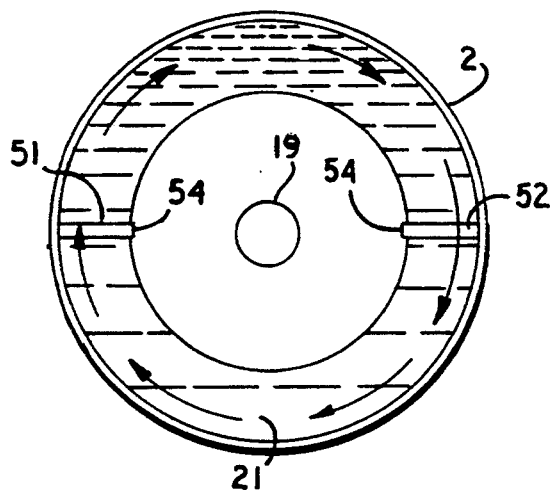
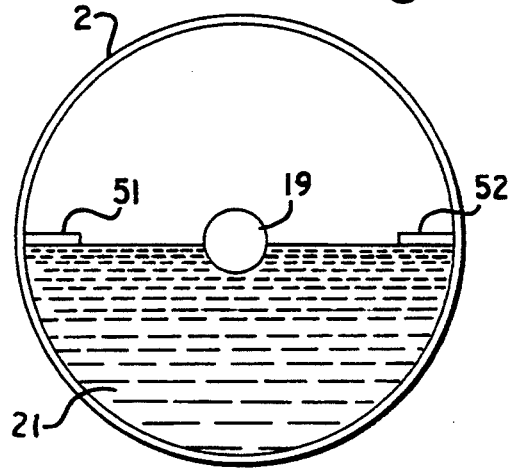
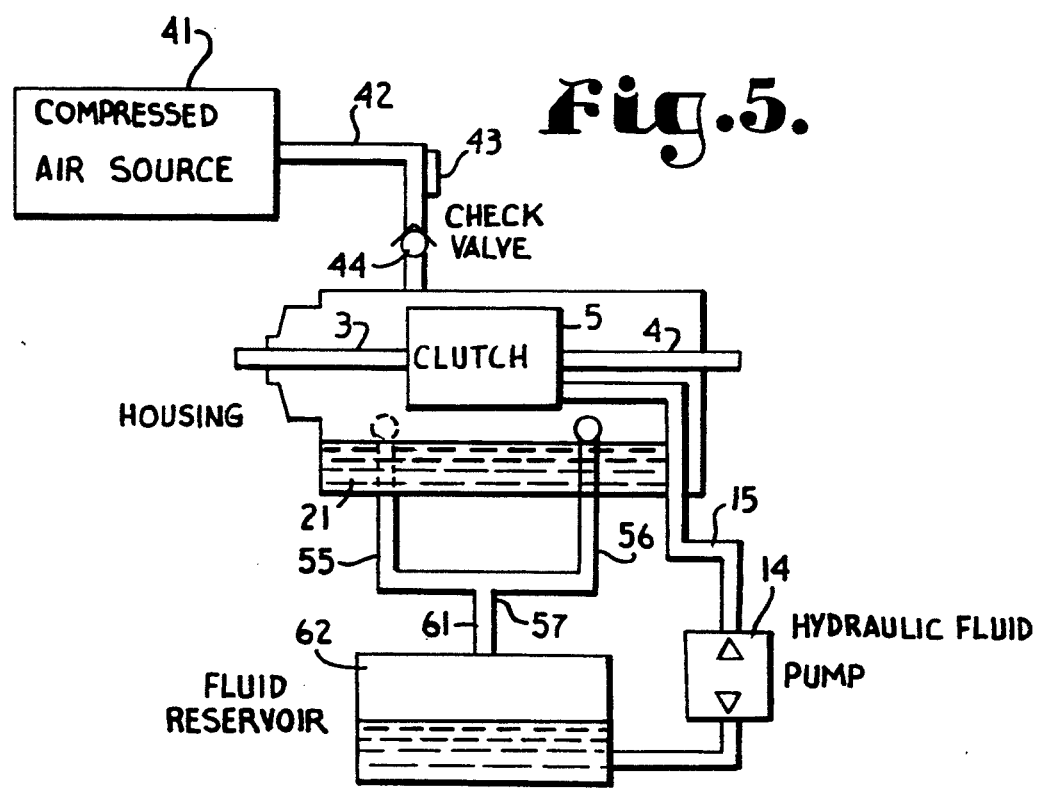

CLUTCH ASSEMBLY WITH AUTOMATIC OIL LEVEL CONTROL SYSTEM

BACKGROUND OF THE INVENTION

1. Field of the Invention

The present invention relates generally to a clutch assembly including a housing enclosing a hydraulically actuated clutch, and more particularly to such a clutch assembly in which pressurized air from an external source is used to regulate the level of oil within the clutch housing by returning excess oil from the housing to a fluid reservoir, such as a vehicle transmission or crankcase.

2. Description of the Related Art

In modern agricultural tractors which include selective front wheel drive, there is generally provided a hydraulic clutch in line with the main drive shaft. When the clutch is disengaged, the front wheels are freely rotating, but with the clutch engaged, a front wheel drive shaft is driven by the main drive shaft via the clutch. Such clutches are generally a part of a clutch assembly including a housing into which the main drive shaft and the front wheel drive shaft extend. The front wheel drive shaft then enters a separate differential housing from which two separate front wheel axles extend.

In such a clutch assembly, it is essential that the oil level within the clutch housing be maintained at or near a predetermined level. Too little oil can, of course, result in damage to the moving parts due to lack of lubrication. On the other hand, too much oil can decrease the efficiency of the clutch assembly, cause cavitation of the oil, "cook" the oil, and unduly heat the clutch assembly due to the large quantity of hot oil it contains. Furthermore, should the housing fill with oil, upon subsequent start-up, the internal seals can blow out due to a sudden increase in pressure, necessitating that the entire assembly be pulled apart for repairs.

However, maintaining the proper amount of oil in such a clutch housing is difficult due to the fact that hydraulically driven clutches tend to leak fluid about their seals, which fluid necessarily accumulates within the clutch housing, thus raising the oil level therein.

One known method of maintaining the proper level of oil in a differential axle housing has been to provide elastomeric, zero leak sealing rings at the interface between the differential clutch and the differential output shafts. This approach is reflected in U.S. Pat. No. 3,913,414 to Freiburger, but this solution has proven to be very expensive and imperfect since the elastomeric seals themselves tend to wear over time and thereby develop leaks.

Another known system for maintaining the proper amount of oil in a differential axle housing is that taught by U.S. Pat. No. 4,529,061 to Glasrud et al., hereinafter the '061 patent. The '061 patent uses an outside air pressure source, such as a turbocharger, to pressurize the axle housing. The amount of air needed to pressurize the housing is but a small portion of the total air output by the turbocharger, and thus engine efficiency is not unduly compromised. An oil return line between the axle housing and the transmission case connects to a stand pipe or blow back tube which extends down into the axle housing. The blow back tube ends in an open port which ports are arrayed just above a predetermined preferred static fluid level for the housing.

When the level of oil in the '061 axle housing exceeds the level of the open ports on both standpipes, then a pressure differential between the pressurized axle housing and the oil return line causes excess oil to be pumped out of the axle housing and back into the transmission case. The oil will be pumped out of the axle housing until the open port on the blow back tube is exposed.

The system disclosed in the '061 patent is generally satisfactory for detecting excess oil in static conditions. However, in the case of a front wheel drive clutch assembly, when the main vehicle transmission is engaged, the main drive shaft and the hydraulic clutch rotate together at relatively high speeds. Thus, the entire volume of oil within the clutch housing tend to be thrown against the basically cylindrical interior walls of the housing by the rotating axle, thus assuming a cylindrical shape. Even when the front wheel drive is not engaged, but the vehicle of tractor is moving, the main drive shaft and the front wheel drive clutch are rotating inside the clutch housing. Thus, truly static clutch conditions occur only when the tractor is being used for a stationary purpose, e.g. for pumping, digging, drilling, etc.

A blow back tube designed to detect static oil levels, as taught by the '061 patent, is thus not capable of detecting excess oil when the clutch assembly is in a dynamic state. Unfortunately, it is during the dynamic condition, i.e. when the main drive shaft and attached clutch is turning, and particularly when the vehicle is traversing uneven terrain, that the clutch will tend to leak oil into the clutch housing.

It is clear then that a need exists for a system which is capable of reliably detecting and evacuating excess oil in a clutch housing when the clutch is in a static and a dynamic state. The system should also be capable of distinguishing elevated oil levels resulting from operation of a vehicle on uneven terrain from truly excessive oil levels.

SUMMARY OF THE INVENTION

In the practice of the present invention, a clutch assembly includes a housing containing a hydraulic actuator, such as a front wheel drive clutch, and is provided with an automatic oil level control system. The oil level control system includes a source of compressed air, which may be an engine exhaust driven turbocharger. The compressed air source is connected to the clutch housing to pressurize the housing. The clutch is connected to a source of pressurized hydraulic fluid, which may be a pump connected to a hydraulic fluid reservoir, such as a vehicle transmission case or crankcase, for example, via a hydraulic fluid supply line. The clutch housing is also connected to the hydraulic fluid reservoir via a separate excess oil evacuation line. The oil evacuation line is connected to the clutch housing via a pair of interconnected blow back tubes. The blow back tubes in the present invention are arrayed on opposite ends of the clutch housing and extend into the housing from opposite sides thereof. Both blow back tubes extend horizontally into the housing and are positioned at a predetermined vertical level in the housing to allow for the proper level of oil during static conditions. At the same time, both blow back tubes are of a length which positions their open ports at a predetermined horizontal level inward from the side walls of the clutch housing to allow for the proper level of oil in the housing during dynamic conditions. Thus, due to the pressurization of the clutch housing, excess oil will be evacuated out of the housing during static or dynamic conditions.

OBJECTS AND ADVANTAGES OF THE PRESENT INVENTION

The objects and advantages of the present invention include: providing a clutch assembly with an automatic oil level control system; providing such an assembly which is pressurized by an outside source of compressed air; providing such a clutch assembly with a housing which is connected to a fluid reservoir, such as a vehicle transmission case or crankcase, via an oil evacuation line; providing such a clutch assembly in which the oil evacuation line is connected into the housing via a pair of interconnected blow back tubes; providing such an assembly in which the interconnected blow back tubes are arrayed on opposite ends and extend horizontally into the housing from opposite sides of the housing; to provide such an assembly in which the arrangement of blow back tubes assures that excess oil will be evacuated from the housing when the clutch is in a static or a dynamic state; and providing such a clutch assembly and oil level control system which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top plan view of a clutch assembly with an automatic oil level control system in accordance with the present invention, with portions broken away to illustrate the positions of a pair of blow back tubes.

FIG. 2 is a side elevational view of a the clutch assembly of FIG. 1, with a blow back tube arrayed on the opposite side of the clutch housing shown in phantom lines.

FIG. 3 is a partially schematic, cross-sectional view of the clutch housing, taken along line 3—3 of FIG. 2, and illustrating the clutch in a dynamic state with the oil assuming a cylindrical configuration.

FIG. 4 is a partially schematic, cross-sectional view of the clutch housing, taken along line 3—3 of FIG. 2, and illustrating the clutch in a static state with the oil collected on the bottom of the housing.

FIG. 5 is a schematic diagram of the clutch housing and automatic oil level control system connected to the hydraulic fluid reservoir and a remote compressed air source.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. Said terminology will include the words specifically mentioned derivatives thereof and words of similar import.

Referring to the drawings in more detail, reference numeral 1 in FIGS. 1 and 2 generally designates a clutch assembly with automatic oil level control system in accordance with the present invention. The assembly 1 includes a housing 2, into which a main drive shaft 3 extends and from which a front wheel drive shaft 4 emerges. A hydraulic clutch 5 selectively drives the front wheel drive shaft 4 via the drive shaft 3, or, alternatively, allows the front wheel drive shaft 4 to be free wheeling when no front wheel drive is desired.

The conventional hydraulic clutch 5 includes a pair of circular Bellville springs 11 and 12 arranged back to back, which springs 11 and 12 are compressed to disengage the front wheel draft shaft 4 from the drive shaft 3, and, conversely, are released to engage the front wheel drive shaft 4. The springs 11 and 12 are shown engaged in the top portion of FIG. 2 and disengaged in the bottom portion. The clutch 5 includes a hydraulically actuated disc 13 which is shown extended to disengage the clutch 5 in the bottom portion of FIG. 2 and retracted to engage the clutch 5 in the top portion of FIG. 5. It should be noted that the springs 11 and 12, as well as the clutch actuator disc 13 are continuous about the shaft 4, but are shown in two different positions merely for illustration.

Hydraulic fluid for clutch actuation is input from a pump 14 via a fluid line 15 leading to a fitting 16 in the housing 2. Hydraulic fluid flows through the fitting 16, down a vertical line 17 and into a hollow center portion 18 of a rotating clutch shaft 19. Hydraulic fluid pressure selectively pushes out a telescoping circular plunger 20, as shown in the bottom portion of FIG. 2, or releases the plunger 20, as shown in the top portion of FIG. 2. The clutch 5 constantly rotates with the drive shaft 3, but engages the front wheel drive shaft 4 when the plunger 20 is withdrawn and the springs 11 and 12 are released. Further conventional details of the selective engagement of the clutch 5 with the shaft 4 have been omitted to avoid confusion.

The housing 2 contains a quantity of oil 21, as shown schematically in FIGS. 3 and 4, to lubricate the drive shafts 3 and 4 and the rotating clutch 5. It is important that the amount of oil 21 in the housing 2 be maintained at or near the desired quantity. This is due to the fact that an excess of oil 21 within the housing 2 can result in decreased performance as the shafts 3 and 4 and the clutch 5 have to move through increased volumes of liquid. Excess oil levels also cause cavitation within the oil 21, reducing lubrication effectiveness. This increases wear and tear on the parts and causes excessive heating of the oil 21, resulting in "cooking" of, and/or premature breakdown of the oil 21.

The clutch 5 includes a pair of seals 22, which can be cast metal seals or elastomeric, which seal the connection between the plunger 20 and a clutch hydraulic reservoir 24. Furthermore, a plurality of circular seals 31, which are stationary relative to the clutch shaft 19, seal the clutch shaft 19, and the main drive shaft 3 to prevent hydraulic fluid from escaping into the housing 2.

Unfortunately, as the shaft 3 and the clutch shaft 19 rotate, slight relative shifting movements between the rotating shafts 3 and 19 and the seals 31 cause hydraulic fluid to leak into the housing 2, raising the level of oil 21 therein. Furthermore, the clutch seals 22, with the clutch 5 rotating at speeds up to 3000 RPM, also tend to leak fluid into the housing 2.

FIGS. 3 and 4 illustrate the effect on the oil 21 of dynamic and static states of the clutch assembly 1. Referring to FIG. 4, when the main vehicle transmission (not shown) is clutched out, such as when the vehicle is idle or is stationary, such as for stationary pumping, spraying, etc., the drive shaft 3 and clutch 5 will also be stationary. Thus, the oil 21 will collect in the bottom of the housing 2, as shown in FIG. 4.

By contrast, when the main vehicle transmission is engaged, the drive shaft 3 and the clutch 5 are rotated at speeds up to 3000 RPM, as stated earlier. This causes the oil 21 to be thrown against the sides of the housing 21, assuming a generally cylindrical shape, as shown in FIG. 3.

II. Automatic Oil Level Control System

Referring to FIGS. 1-5, the housing 2 is pressurized via a compressed air source 41, a compressed air line 42, a bleed air valve 43 and a check valve 44. The compressed air source 41 can be an engine exhaust driven turbocharger (not shown). The check valve 44 prevents air from back flowing in the line 42 while the bleed air valve 43 allows just a small quantity of compressed air to be drawn from the line 42 to prevent the performance of the turbocharger from being degraded.

A pair of blow back tubes 51 and 52 extend horizontally into the housing 2. The tubes 51 and 52 extend inward from opposite sides of the housing 2 and are substantially spaced longitudinally from each other along the housing 2. The blow back tubes 51 and 52 each include an open port 53 and 54 in the ends thereof, and the tubes 51 and 52 are connected to respective lines 55 and 56, which interconnect in a T connector 57. An oil evacuation line 61 extends from the T connector 55 to a fluid reservoir 62. The fluid reservoir 62 can be the vehicle engine crankcase or transmission case, for example. Referring to FIG. 5, the pump 14 and line 15 transfers fluid back and forth between the fluid reservoir 62 and the clutch 5 when the clutch 5 is engaged and disengaged, respectively.

III. Operation

The housing 2 is pressurized via the pressure source 41 to an internal pressure which is slightly above the head pressure in the oil evacuation line 61. The open ports 53 and 54 of the blow back tubes 51 and 52 are positioned just slightly above the normal level of oil 21 in the housing 2 during static clutch conditions, as shown in FIG. 4. In addition, the ports 53 and 54 also extend inward from the housing 2 to a position which is just inside the cylinder of oil 21 when the clutch 5 is in a dynamic condition, as illustrated in FIG. 3.

When the level of oil 21, in either the static or the dynamic condition of the clutch 5, is excessive, then both ports 53 and 54 will be covered with oil and the elevated air pressure in the housing 2 will cause the excess oil to be blown out of the housing 2 via the blow back tubes 53 and 54, through the T connector 57 and the oil evacuation line 61 to the fluid reservoir 62. When sufficient oil 21 has been evacuated in this manner, the ports will be exposed again, and only air will enter the ports 53 and 54.

The relative positions of blow back tubes 51 and 52 on opposite sides of the housing 2 and their spacing longitudinally along the housing 2 insures that operation of the associated vehicle over uneven terrain will not result in oil being evacuated. This is due to the fact that, as one of the ports 53 and 54 is covered with oil due to the shifting or slanting of the housing 2, if the level of oil is not excessive in the housing 2, then the other port will necessarily be uncovered. Thus, air pressure from the exposed port reaching the T connector __ will prevent oil from being evacuated through the covered port.

The inventive oil level control system thus prevents the build-up of excess oil within the clutch assembly 1 under all operating conditions, effectively extending oil life, increasing operating efficiency, and reducing wear and tear on moving parts.

It is to be understood that while certain forms of the present invention have been illustrated and described herein, it is not to be limited to the specific forms or arrangement of parts described and shown.

What is claimed and desired to be secured by Letters Patent is as follows:

1. A liquid level control system which uses pressurized gas to regulate the level of liquid in a first chamber which encloses a hydraulic actuator by returning excess liquid from said first chamber to a second chamber, wherein said hydraulic actuator has both static and dynamic states, said liquid collecting in the bottom of said first chamber when said actuator is in said static state and being propelled into a cylindrical shape within said first chamber when said actuator is in said dynamic state, said system comprising:

(a) at least one blow back tube which extends into said first chamber, said blow back tube including an open port positioned at a vertical level within said first chamber which is just above a static preferred level of liquid in said first chamber and said blow back tube is oriented such that said open port is at a horizontal position within said first chamber which is just inside said cylindrical shape of liquid when said hydraulic actuator is in a dynamic state and said liquid is at said preferred level; and (b) an oil evacuation line connected between said blow back tube and said second chamber.

2. A system as in claim 1, wherein:

(a) there are a pair of said blow back tubes, each one with an open port, and each said tube extending from respective opposite sides of said housing into said first chamber such that both open ports are at said vertical level and both ports are positioned horizontally just inside said cylindrical shape of liquid.

3. A system as in claim 2, wherein:

(a) said blow back tubes are spaced longitudinally along said first chamber.

4. A clutch assembly including a lubricating liquid level control system, said clutch assembly having a first chamber and both static and dynamic states, said lubricating liquid collecting in the bottom of said first chamber when said clutch is in said static state and being thrown into a cylindrical shape within said first chamber when said clutch is in said dynamic state, comprising:
- (a) a housing which encloses a hydraulic clutch and lubricating liquid outside of said hydraulic clutch;
- (b) a source of pressurized air connected to said housing;
- (c) at least one blow back tube which extends into said housing from a side thereof, said blow back tube including an open port positioned at a vertical level within said housing which is just above a static preferred level of lubricating liquid in said housing, said blow back tube being of a predetermined length such that it extends into said housing to a position at which said open port extends horizontally just past the extent of said liquid cylindrical shape when said clutch is in said dynamic state and said liquid is at said preferred level;
- (d) a chamber connected to supply hydraulic fluid to said clutch; and
- (e) an oil evacuation line connected between said blow back tube and said chamber.

5. A system as in claim 4, wherein:
- (a) there are a pair of said blow back tubes, each one with an open port, and each said tube extending from respective opposite sides of said housing into said first chamber such that both open ports are at said vertical level and both ports are positioned horizontally just inside said cylindrical shape of liquid.

6. A system as in claim 5, wherein:
- (a) said blow back tubes are spaced longitudinally along said housing.

7. In a vehicle which includes selective front wheel drive, a front wheel drive clutch assembly with automatic oil level control, comprising:
- (a) a housing which encloses a hydraulic clutch and lubricating oil outside of said hydraulic clutch, said main drive shaft having both static and dynamic states, said lubricating oil collecting in the bottom of said housing when said main drive shaft is in said static state and being thrown into a cylindrical shape within said housing when said main drive shaft is in said dynamic state;
- (b) a main drive shaft connected to said hydraulic clutch;
- (c) a front wheel drive shaft connected to said clutch when said clutch is actuated;
- (c) a source of pressurized air connected to said housing;
- (d) at least one blow back tube which extends into said housing from a side thereof, said blow back tube including an open port positioned at a vertical level within said first chamber which is just above a static preferred level of lubricating oil in said first chamber, said blow back tube being of a predetermined length such that it extends into said housing to a horizontal level at which said open port extends just past the extent of said oil cylindrical shape when said main drive shaft is in said dynamic state and said oil is at said preferred level;
- (e) a chamber connected through said housing to said clutch to selectively provide hydraulic fluid to said clutch; and
- (f) an oil evacuation line connected between said blow back tube and said chamber.

8. A system as in claim 7, wherein:
- (a) there are a pair of said blow back tubes, each one with an open port, and each said tube extending from respective opposite sides of said housing into said first chamber such that both open ports are at said vertical level and both ports are positioned horizontally just inside said cylindrical shape of liquid.

9. A system as in claim 8, wherein:
- (a) said blow back tubes are spaced longitudinally along said housing.

* * * * *